United States Patent [19]

Westergren et al.

[11] 3,931,943
[45] Jan. 13, 1976

[54] AIRPLANE RUDDER AND CONTROLS

[75] Inventors: Don M. Westergren, La Mesa; Walter E. Mooney, San Diego, both of Calif.

[73] Assignee: Rohr Industries, Inc., Chula Vista, Calif.

[22] Filed: Aug. 30, 1974

[21] Appl. No.: 502,057

[52] U.S. Cl. .................................. 244/86; 244/50
[51] Int. Cl.² ........................................ B64C 19/02
[58] Field of Search...... 244/86, 50, 2, 83 R, 103 R, 244/100; 74/512, 513, 478, 481, 474, 591.4

[56] References Cited
UNITED STATES PATENTS

| | | | |
|---|---|---|---|
| 1,714,170 | 5/1929 | Jette | 244/50 |
| 1,895,682 | 1/1933 | Raymond | 244/86 X |
| 2,110,563 | 3/1938 | Thaon | 244/2 |
| 2,203,933 | 6/1940 | Thorp | 74/513 |
| 2,240,259 | 4/1941 | Gwinn | 244/83 R |
| 2,254,260 | 9/1941 | Arcier et al. | 244/50 X |
| 2,424,523 | 7/1947 | Watter | 244/86 |
| 2,667,939 | 2/1954 | Purkey | 244/86 |
| 3,525,266 | 8/1970 | Brooks et al. | 74/478 |

FOREIGN PATENTS OR APPLICATIONS

| | | | |
|---|---|---|---|
| 491,298 | 8/1938 | United Kingdom | 244/100 |
| 674,403 | 6/1952 | United Kingdom | 74/478 |
| 1,356,309 | 2/1964 | France | 74/478 |

Primary Examiner—Trygve M. Blix
Assistant Examiner—Galen L. Barefoot
Attorney, Agent, or Firm—Patrick J. Schlesinger

[57] ABSTRACT

In a small airplane, a combination nose wheel, shroud and rudder is provided. The shroud encloses all but a lower cord of the wheel. The shroud has an aerodynamic profile and is pivotable for inflight guidance by a pair of actuator pedals pivoted to the interior structure of the cabin. The shroud is directionally operatable by the pedals operating through a bellcrank and connecting rod. The shroud is returnable to a normal straight flight condition by airstream forces alone. An additional interconnection is provided from the shroud for simultaneously controlling a conventional rear rudder.

6 Claims, 6 Drawing Figures

U.S. Patent    Jan. 13, 1976    Sheet 1 of 2    3,931,943
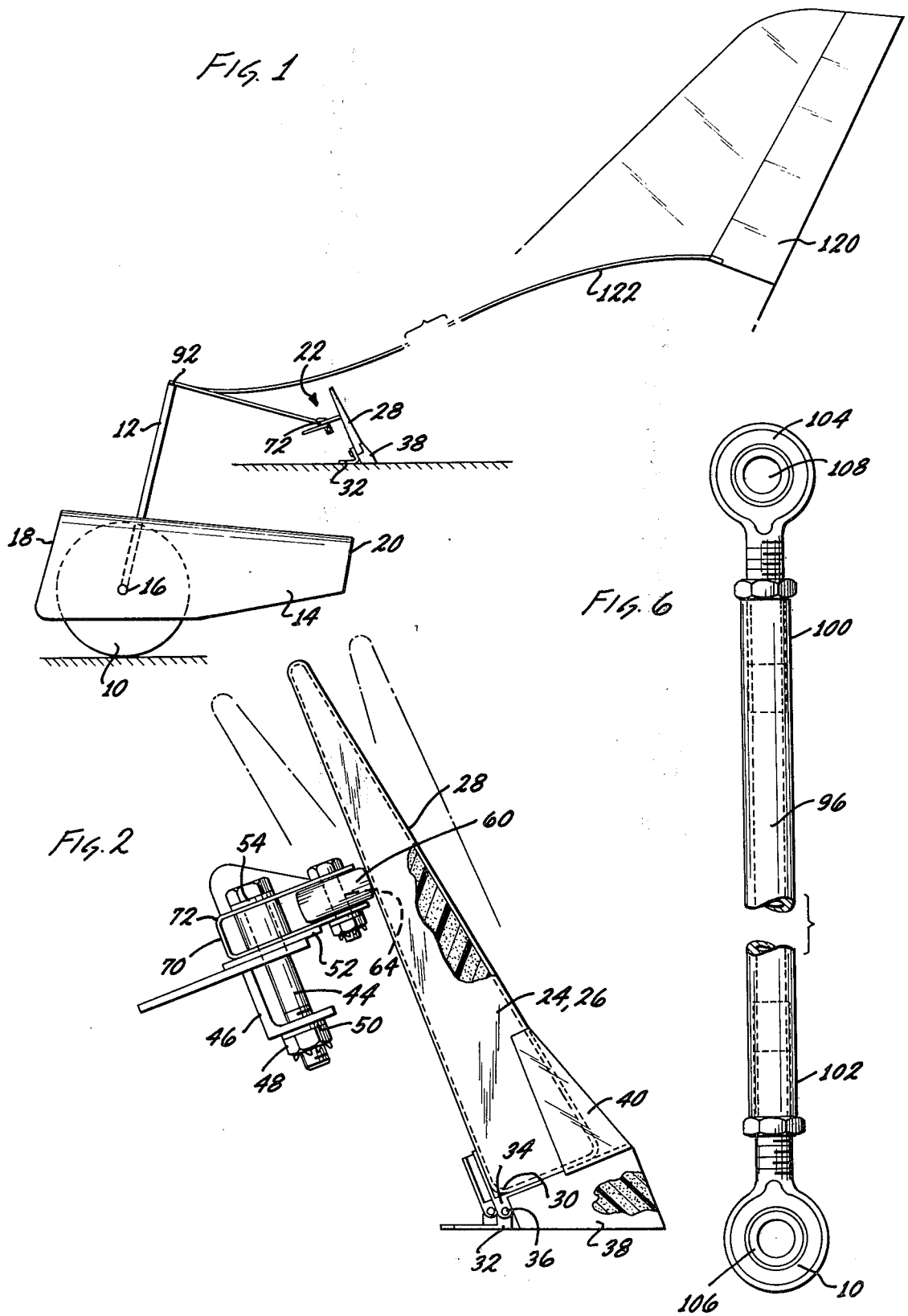

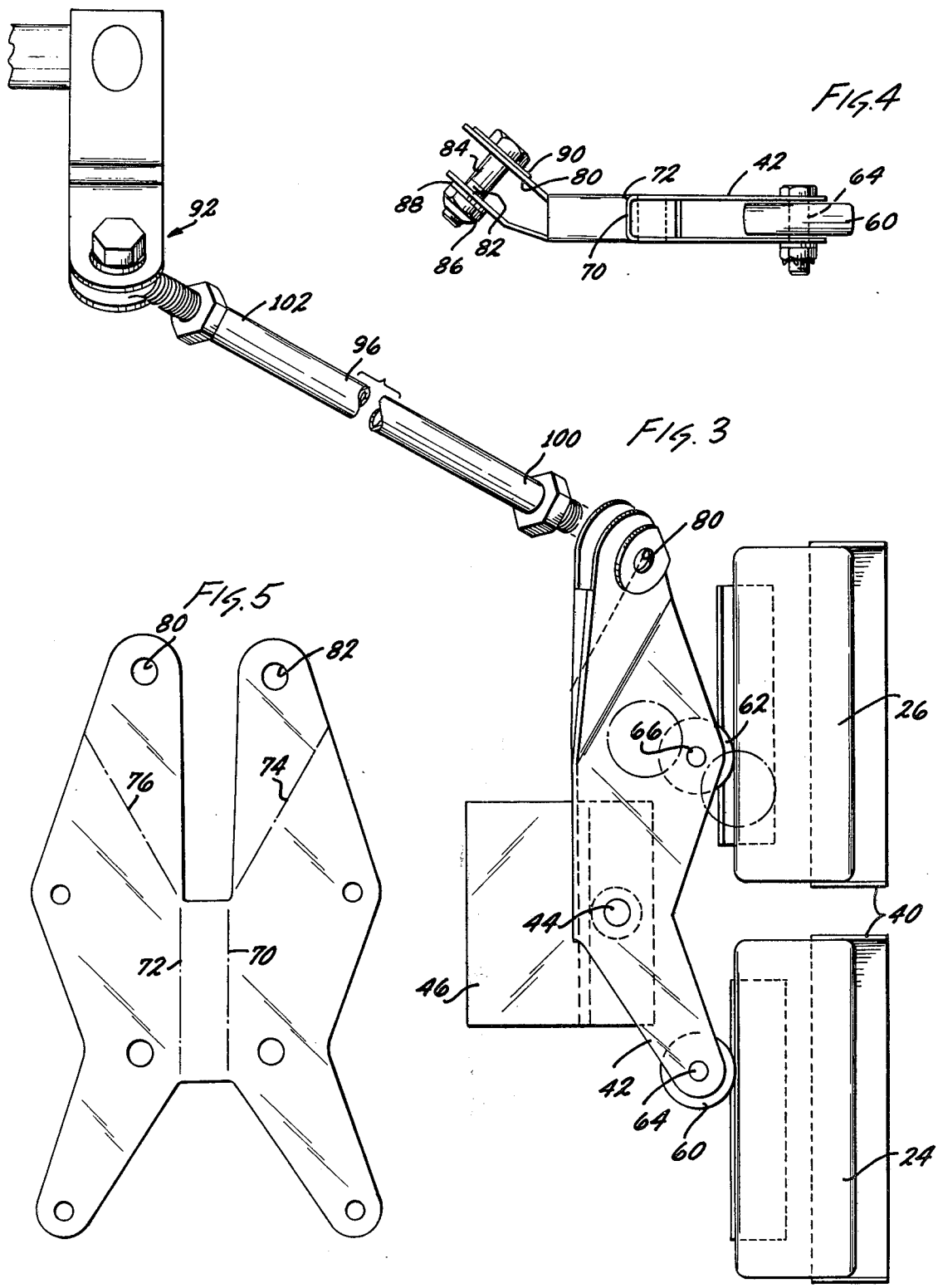

AIRPLANE RUDDER AND CONTROLS

BACKGROUND OF THE INVENTION

The present invention related to a combination nose wheel shroud and rudder and the actuating mechanism necessary to pivot the rudder in its flight guidance positions.

Small aircraft capable of carrying anywhere from two to four people come in a great variety of sizes, shapes and incorporate any number of mechanical principles. The selection of those production and non-production craft is so great that no attempt will be made to detail the various aspects, advantages and deficiencies of any prior present art aircraft. The present invention, however, is directed to the provision of a light-weight and inexpensive, but high performance craft designed to make a personal airplane more readily available to those in a wide range of income brackets. Specifically, the present invention concerns a combination nose wheel shroud and rudder control which is uniquely adaptable to a very lightweight, and inexpensive but high performance airplane.

There are many variations of landing gear controls used for small planes, for instance, in some embodiments, a nose wheel and its shroud are operable within a certain limited range of permitted movement via pedal actuators and a system of gears and cables. Such mechanisms are effective in performing the function of properly positioning the nose wheel of the craft, however, the combination of gears and cables is too expensive and complicated for utilization in a truly low cost aircraft. A similar system is illustrated in Patent 3,753,540 to Renner in which apparatus is disclosed for the steering of the nose wheel of the craft after touchdown is made. A foot operated bell crank actuates both the rudder and the nose wheel. While the mechanism disclosed is not overly complicated and its movement is rather effective, the present invention, by combining the nose wheel shroud thereby performs the same function with fewer parts and consequently less production cost. U.S. Pat. No. 2,814,452 to Blanchard in a most general manner discloses a steering wheel or mechanism that control both the rudder and the nose wheel. As in the case of the Renner patent, the present invention eliminates duplicated structure and is therefore superior to the structure disclosed in that patent. There are many other patents for planes which illustrate combined nose/wheel and rudder control systems. The present invention, however, utilizes the contour of the nose wheel shroud as a functioning rudder and therefore requires only a simplified, light-weight and inexpensive mechanism to provide actuation of the combined system for both inflight guidance and touch down control and subsequent steerage of the craft.

SUMMARY OF THE INVENTION

In a small airplane, the nose wheel shroud functions as the rudder and is controlled by actuator means mounted in the forward part of the cabin. The nose wheel shroud is streamlined and covers all but the lowermost chord of the nose wheel. A pair of pedal actuators is pivoted to the floor of the cabin and these pedals are active on a pair of followers which are journalled on a bell crank pivoted to the cabin structure directly behind the pedals. The pedals impart a pivotal motion to the bell crank to which is connected a connecting rod; that rod extends to the nose wheel shaft means, via a bracket, the nose wheel shaft being journalled in that bracket. There is no return mechanism to return the rudder controls to a static or equilibrium position, rather the aerodynamic forces on the nose wheel shroud or rudder, return the mechanism to that position. The bell crank is formed with a substantially U-shaped cross-section, or with symetrically disposed upper and lower plates and the followers are rollers which are journalled in the opposing plates of the bell crank. An angle bracket fastens the bell crank to the interior of the cabin and a similar bracket pivotally connects the actuator pedals slightly aft and below the bell crank to the floor of the cabin. The pedals are formed with a generally right triangle cross-section, the connection to the cabin floor being generally along the edge opposite the hypotenuse of the pedal. The pedals are formed from a relatively light-weight cellular material over which is fitted a relatively thin but rigid skin. A resilient biasing cushion is fitted between the actuator pedal and the cabin floor and that cushion is adapted to absorb the back motion of the non-deployed actuating pedal. An optional or auxiliary rudder may be provided on the tail wing of the aircraft and a connecting cable may extend between that rudder and the nose wheel shaft to impart similar motion to the optional rudder.

The above and other aspects of the invention will be apparent as the description continues and when read in conjunction with the appended drawings.

BRIEF DESCRIPTION OF THE DRAWINGS

FIG. 1, is a semi-diagramatic side view of the nose wheel shroud-rudder control means enclosed within the aircraft cabin;

FIG. 2, is a side elevational view of the actuator pedals and bell crank means;

FIG. 3, is a plan view of the actuator pedals and bell crank structure;

FIG. 4, is a side elevational view of the bell crank;

FIG. 5, is a plan view of the bell crank shown prior to the bending of the plates in a parallel relation;

FIG. 6, illustrates the adjustable control rod.

DETAILED DESCRIPTION

Referring to FIG. 1, it is seen that the nose wheel 10 is connected to a shaft 12. A shroud 14 is connected at 16 to shaft 12. That shroud is profiled with aerodynamic properties. It is somewhat elongated and has a leading edge 18, and trailing edge 20.

The function of the combination shroud-rudder 14 is identical to that of any ordinary rudder. Simply, when the rudder 14 is turned to the left or right, the plane bears in that respective direction. There is no mechanism provided to return the rudder to a static in-flight position; rather, that is accomplished by permitting the aerodynamic forces on the rudder 14 to return it to its center position. In effect, the aerodynamic forces on the rudder are the motivating forces which resets the entire apparatus to its normal condition.

Turning now to FIGS. 2 and 3, we see the control means referred to as numeral 22. The prime mover of this system is provided by a pair of pedals, 24, 26, which are preferably of right triangular cross section. The body of the pedals may be fabricated by a lightweight, but structurally firm, cellular material. A thin skin 28 surrounds the entire pedal and that skin is preferably a hard plastic, such as acrylic. It should be evident that the pedals 24, 26 have been designed to provide acceptable structural integrity but, in addition, contribute very little weight to the craft.

Each pedal, 24, 26, is pivoted to the floor of the cabin, along the edge 30, which is the edge opposite the hypotenuse of the triangular cross of the pedals, by means of a pair of overlapping brackets, 32, 34, which are pinned in their aligned center holes 36. For reasons which will become apparent as the description continues, the pedals, 24, 26, are also provided with resilient pads 38, such as foam rubber. Those pads have a generally trapazoidal cross section and are received between the cabin floor and lower face of the pedals, 22, 24. The pads further include a flange part 40 that extends upwardly and overlies the lower part of the hypotenuse face of the pedal.

FIG. 3 illustrates the bell crank means 42. That means is pivoted to the cabin interior directly in front of the pedals, 24, 26, by means of a bolt 44, angle bracket 46, nut 48 and washers, 50, 52, 54 arrangement.

As seen best in FIG. 3, a pair of rollers, 60, 62, are journalled into the bell crank 42 at centers 64, 66, a system of bolts, nuts and washers providing the joinder. Those rollers are positioned contigious the forward faces of the actuator pedals 24, 26 and function to transfer the movement of those pedals to the bell crank 42. It should be apparent that depression of pedal 24, causes a following reaction by roller 60 and consequent clockwise rotation of the bell crank 42. Similarly, depression of pedal 26 causes the bell crank 42 to rotate in the counter-clockwise direction. From the arrangement illustrated, it is clear that depression of any pedal, causes a reverse pivoting of the opposite pedal since room must be made for the movement of the bell crank 42. It is for this reason that the resilient pads 38 are included. The reverse movement of the non-actuated pedal is cushioned and somewhat resisted by the compression of the corresponding pad.

FIGS. 2, 4 and 5 illustrate the U-shaped cross section of the bell crank 42. The bell crank 42 may be formed from a sheet material cutout of the symetrical, irregular shape as shown in FIG. 6. The cutout is then bent along the creases 70, 72 so as to form identical plates. The cutout is further bent along the creases 74 and 76 so as to form a lip disposed at pre-selected angle to the plane of the bell crank 42. A pair of opposed, aligned holes 80, 82 are drilled in the two plates comprising the bell crank 42. A small shaft or bolt 84 is fastened in those holes via a nut 86 and washers 88, 90. Another similar lip 92 and bolt is fastened on the nose wheel shaft 12. A connecting rod 96, shown in FIG. 6, connects the bolts by means of bored and threaded ends 100 and 102, of that rod and screw eyes 104, 106 having threaded shanks mating with the bored rod ends. The ring parts 108, 110 are journalled on the bolts 72, and this arrangement permits the connecting rod 102 to be adjusted from time to time to take up any slack in the system.

It should be evident, from the above description, that the motion of the bell crank 42 is transferred to the lip and to the connecting rod 108. That connecting rod is effective to push or pull bracket 92 with a corresponding rotation of the nose/wheel shaft 12. The rotation of the shaft is then manifested in the corresponding rotation of the rudder 14. As previously stated, there is no mechanism for return of the controls or rudder to the center position; rather, the airstream forces on the rudder actuate the return motion. From FIG. 1, it should be noted that this craft may be provided with an auxiliary rudder 120 which can be connected to nose/-wheel shaft 12 by means of a cable 122. It should also be noted that the structure hereinbefore described may be used merely for nose/wheel steering during ground roll. In any of its uses, the apparatus disclosed is characterized by an economy of parts which have a simple, direct movement, and are light-weight but have structural integrity.

Many changes may be made in details of the instant invention, in the method and materials of fabrication, in the configuration and assemblage of the constituent elements, without departing from the spirit and scope of the appended claims, which changes are intended to be embraced therewithin:

We claim:

1. A rudder actuator which comprises a pair of actuator pedals pivoted to the interior of the cabin, pivotal crank means comprising a pair of crank plates joined along adjacent edges thereof, follower means comprising rollers journalled in said crank plates adjacent said actuator pedals cooperating with said actuator pedals to pivot said crank means between its extreme positions, a connecting rod movably connected to said crank means and effective to transfer the movement of said crank means to said rudder.

2. In the rudder actuator of claim 1, said pedals include rub plates clad on the pedals and active to impart movement to said rollers.

3. In the rudder actuator of claim 2, length adjustment means connected to the ends of said connecting rod.

4. In the rudder control of claim 1, said pedals comprise a relatively light cellular body and a relatively thin and rigid outer skin.

5. In the rudder control of claim 4, said pedals are of generally right triangular cross section and pivoted the cabin interior along the edge between the triangle legs.

6. In the rudder control of claim 4, resilient biasing cushions active on the bottoms of said actuator pedals and adapted to cushion the back motion of a non-deployed actuator pedal.

* * * * *